United States Patent [19]

Murphy

[11] Patent Number: 5,159,528
[45] Date of Patent: Oct. 27, 1992

[54] MODULAR PERSONAL COMPUTER

[75] Inventor: Preston J. Murphy, Austin, Tex.

[73] Assignee: Compuadd Corporation, Austin, Tex.

[21] Appl. No.: 623,589

[22] Filed: Dec. 7, 1990

[51] Int. Cl.$^5$ .......................... H05K 5/02; H02B 1/01;
A47B 47/02; G06F 1/00
[52] U.S. Cl. .................................. 361/380; 361/390;
361/429; 312/257.1
[58] Field of Search .............. 364/708, 929.2; 211/41;
312/257.1, 264, 265.1, 265.3, 265.6; 361/380,
390, 391, 392, 393, 394, 395, 399, 415, 429

[56] References Cited

U.S. PATENT DOCUMENTS

| | | | |
|---|---|---|---|
| 4,401,351 | 8/1983 | Record | 361/395 X |
| 4,479,198 | 10/1984 | Romano et al. | 364/708 X |
| 4,533,793 | 8/1985 | Geppert | 361/415 X |
| 4,699,270 | 10/1987 | Bohm | 211/41 X |
| 4,725,244 | 2/1988 | Chewning et al. | 364/708 X |
| 4,728,160 | 3/1988 | Mondor et al. | 312/257.1 X |
| 4,742,477 | 5/1988 | Phillips et al. | 364/708 |
| 4,758,924 | 7/1988 | Dillon et al. | 361/399 X |
| 4,977,532 | 12/1990 | Borkowicz et al. | 364/708 |
| 5,006,959 | 4/1991 | Freige et al. | 361/415 X |
| 5,032,952 | 7/1991 | Cooke et al. | 361/392 |
| 5,051,868 | 9/1991 | Leverault et al. | 361/395 |
| 5,053,925 | 10/1991 | Kitajama | 211/41 X |

FOREIGN PATENT DOCUMENTS

| | | | |
|---|---|---|---|
| 1320857 | 6/1987 | U.S.S.R. | 361/429 |
| 2000017 | 1/1979 | United Kingdom | 312/257.1 |

Primary Examiner—Leo P. Picard
Assistant Examiner—Michael W. Phillips
Attorney, Agent, or Firm—Baker & Botts

[57] ABSTRACT

A computer tower chassis (10) has a base system unit (20) and a main circuit board subassembly (30). The base system unit (20) includes base system frame (200) having a front panel (21) and rear panel (26) and supporting frame (201, 202, 203, 204, and 205) therebetween. Disk (22), control panel (23), power supply (24), and floppy drives (29) mount to the base system unit (20). The main circuit board subassembly (30) includes main circuit board (31), input/output board and cable (32), speaker and cable (33), fan assembly and cable (35), keyboard cable (36), expansion card (37) and expansion card guides (38) and (39). Main circuit board subassembly (30) fits within and adjacent to base system unit (20), with chassis cover (40) surrounding both modules. The modular design allows for safer and more efficient manufacturing and handling.

1 Claim, 4 Drawing Sheets

MODULAR PERSONAL COMPUTER

TECHNICAL FIELD OF THE INVENTION

This invention relates to a method and apparatus for a manufacturer to assemble electronic hardware for an electronic system and more particularly to a method and system for assembling a computer tower chassis.

BACKGROUND OF THE INVENTION

Computer systems, particularly personal computer systems, include a box or chassis that contains the electronic hardware of the central processing unit and communication cables for transferring data between terminals and other data communications components. Typically, the manufacture of the chassis includes forming a metal support frame to receive the electronic hardware and placing a cover around the electronic components and the support frame. Although a personal computer chassis is sufficiently small that one person usually can pick it up, a fully assembled unit weighs approximately 70 pounds.

As factory assembly of a personal computer chassis takes place, the chassis increases in weight and becomes more difficult to maneuver along an assembly line. Picking up and moving the heavy computer chassis can present safety and handling problems for factory workers. If a method and apparatus existed to preassemble major portions of the computer chassis prior to full assembly of the chassis itself, the weight of the chassis could be distributed among the major modular portions. This would eliminate problems associated with moving and handling the complete tower chassis until final assembly.

A fully assembled tower chassis includes a main circuit board that comprises a central processing unit and other communications and data processing electronic components as well as power conversion and distribution components that operate the computer. If it were possible to separate a significant portion of the tower chassis electronic components in a modular fashion to concentrate repair efforts on a major modular section, handling safety problems associated with these repairs would also be minimized.

Related problems exist with respect to efficiency in manufacturing the computer chassis. For example, known tower chassis assembly methods begin with the chassis structural frame. Throughout the computer assembly, all electronic and mechanical components of the tower chassis are installed on the structural frame. As components on the structural frame become more densely packed together, it becomes increasingly difficult for more than one worker to assemble additional components on the structural frame. As a result, the manufacturing process slows as the tower chassis becomes more densely packed with mechanical and electronic components.

If a system and method existed to allow workers to first assemble major portions of the computer tower chassis and then connect the major portions together, more than one worker could easily assemble the separate major portions. This would increase computer tower assembly rates and ultimately increase the manufacturing process efficiency.

Consequently, there is a need for a method and apparatus that minimizes the safety, handling, and assembly problems associated with manufacturing a computer chassis. There is a need for an apparatus that allows repair personnel to safely and efficiently disassemble a computer tower chassis for the purpose of isolating and repairing defective components of the computer tower chassis.

There is a need for a method and apparatus that allows more than one factory worker to simultaneously assemble portions of a computer tower chassis.

SUMMARY OF THE INVENTION

The present invention provides a computer tower chassis and chassis manufacturing process which overcome the problems and satisfy the needs previously considered. The method and apparatus allow modular assembly of major portions of the computer tower chassis during the manufacturing process, thereby allowing manufacture of major portions: of the tower chassis followed by assembly of the major modular portions just prior to final electronic component testing and burn in.

The computer tower chassis of the present invention accomplishes these objectives by separating the tower chassis into a base system unit and a main circuit board subassembly. The base system unit provides the major structure for the tower chassis and includes floppy drives and hard drives, a control panel, a power supply, and appropriate cables. The main circuit board assembly includes the principal electronic components of the computer tower chassis such as the main circuit board itself, the input/output boards and cables, battery pack and cable, speaker assembly and cables, fan assembly and cables and all required expansion boards.

In the manufacture of the computer tower chassis, the base system unit and the main circuit board subassembly can be manufactured at the same time (i.e., in parallel). When the base system unit and main circuit board subassembly are complete, they can be joined together to form a computer tower chassis sufficiently complete for final testing and burn in. Thereafter, the tower chassis cover is placed around the chassis to complete the manufacturing process. The base system unit has a structural frame and support members associated to receive the main circuit board subassembly and to structurally support both the main circuit board subassembly, as well as the components that attach to the base system unit.

If, as a result of testing, one or more components on the base system unit or the main circuit board subassembly are shown to be defective, the defective portion can be promptly replaced by a fully functional modular portion. By swapping out the defective module with a satisfactory one, the assembly process can continue to completion for that particular tower chassis.

Placing the primary electrical and mechanical portions of the tower chassis on the base system unit and the electronic components on the main circuit board subassembly divides the computer tower chassis weight. As a result, until final assembly, the module that a worker handles weighs significantly less than the complete tower chassis. This results in safer and more easily maneuverable components prior to final assembly.

BRIEF DESCRIPTION OF THE DRAWINGS

For a more complete understanding of the present invention and further advantages thereof, reference is now made to the following detailed description taken in conjunction with the accompanying drawings in which.

DETAILED DESCRIPTION OF THE INVENTION

Figure 1:
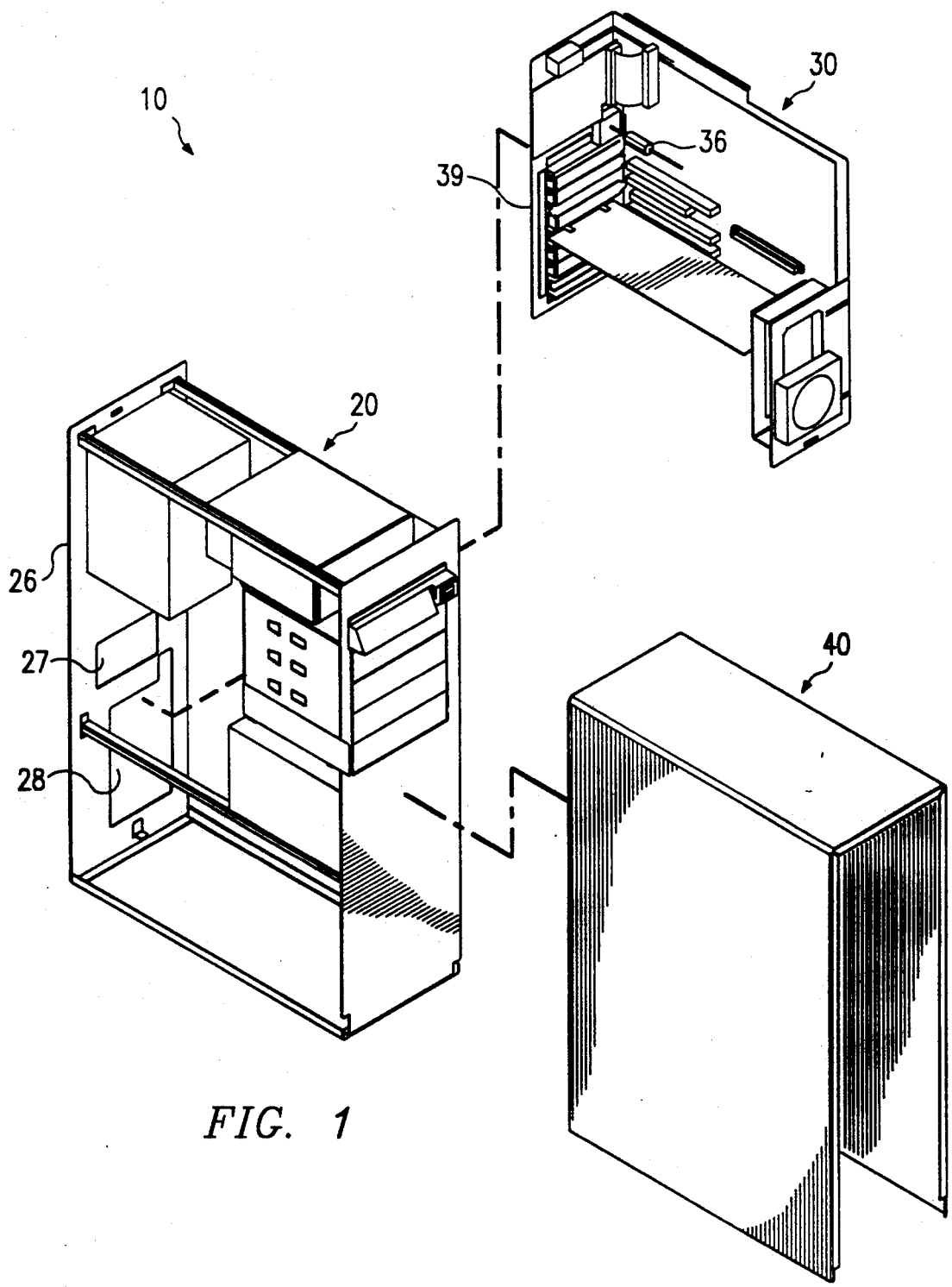
FIG. 1 shows an exploded view of the modular tower chassis of the present invention and its associated cover.

FIG. 1 illustrates the modular design of the present invention. Computer chassis 10 includes the base system unit 20, adjacent to which fits main circuit board subassembly 30. Once base system unit 20 and main circuit board subassembly 30 join to form computer tower chassis 10, cover 40 fits over it to protect computer tower chassis 10. Main circuit board subassembly 30 has keyboard cable 36 and rear expansion card guides 39 which fit through openings 27 and 28 on the rear portion 26 of base system unit 20.

Figure 2:
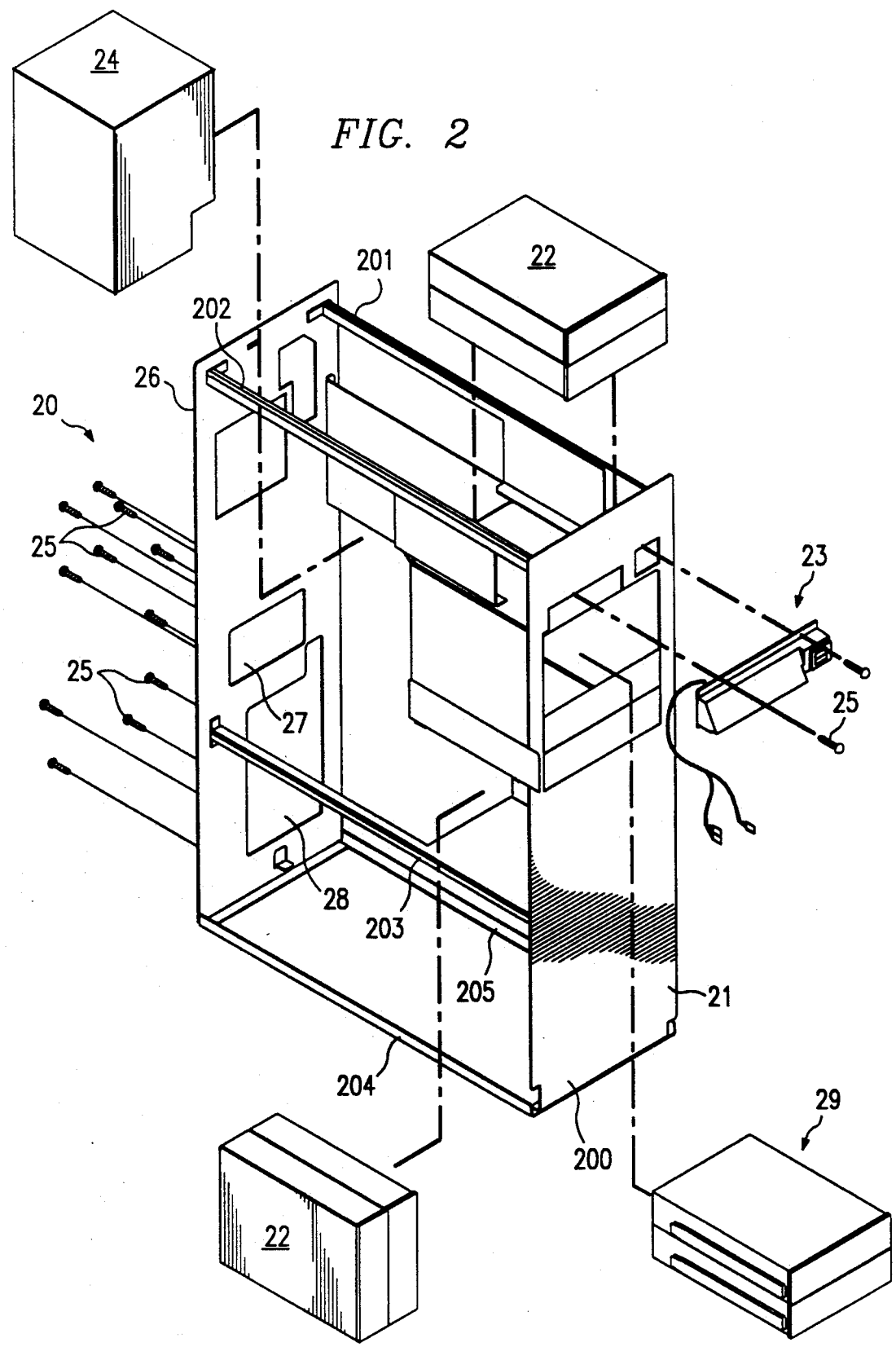
FIG. 2 is an exploded perspective of the base support unit of the modular tower chassis of the present invention.

FIG. 2 shows a more detailed and exploded perspective view of base system unit 20 according to the preferred embodiment of the present invention. Base system unit 20 includes support frame 200 which comprises front support plate 21 and rear support plate 26. Between front support plate 21 and rear support plate 26 are structural beams 201, 202, 203, 204 and 205. Within support frame 200 are various components that form base system unit 20. Hard drives 22 and power supply 24 mount within base system unit 20. Attaching to and extending through base system unit 20 are control panel 23 and floppy drives 29. Fasteners 25 securely hold each of these units to base system unit 20 and attach main circuit board subassembly 30 to base system unit 20.

Figure 3:
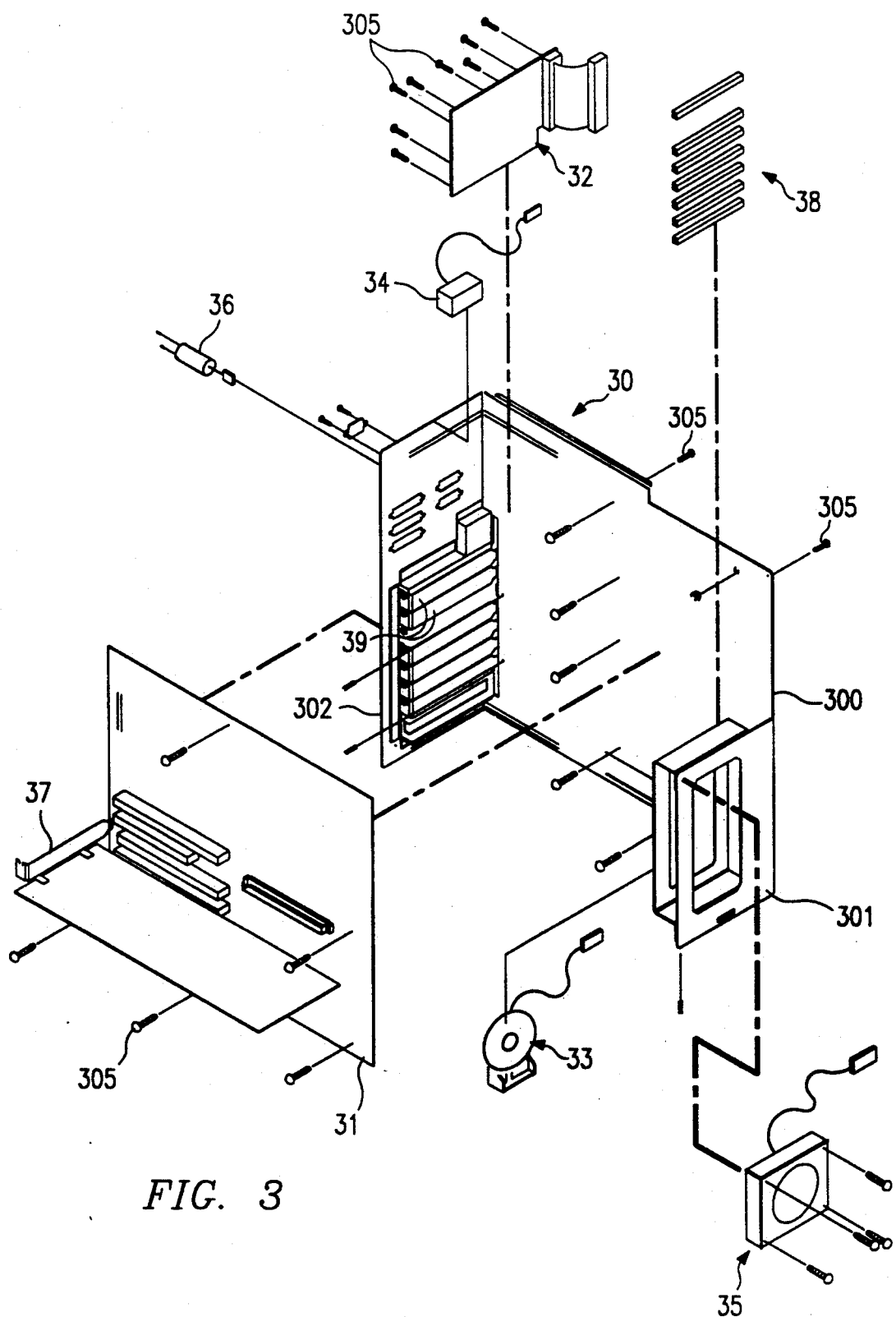
FIG. 3 is an exploded perspective view of the main circuit board subassembly of the present invention.

FIG. 3 provides an exploded perspective view of main circuit board subassembly 30 in the preferred embodiment of the present invention. Main circuit board subassembly 30 includes the subassembly plate 300 having integral thereto rear panel 302 and front subassembly panel 301. Front subassembly panel 301 includes the front expansion board guides 38. Rear panel 302 includes rear expansion slots 39. Main circuit board 31 mounts to subassembly plate 300 so that expansion cards 37 may connect within front expansion card guides 38 and rear expansion slots 39. Input/output board and cable 32 mounts to subassembly plate 300. Speaker assembly and cable 33 and fan assembly and cable 35 mount to front subassembly panel 301. Battery pack and cable 34 and keyboard cable 36 mount to and through rear subassembly panel 302. Numerous fasteners 305 secure the above components to main circuit board subassembly plate 300.

In the design of FIGS. 2 and 3, principally mechanical and electrical components attach to base system unit 20. These all attach to the front and rear panels of base system frame 200 in a way that provides sufficient room for subsequent insertion of the completed main circuit board subassembly 30. Main circuit board subassembly 30 has various components that penetrate through base system frame 200 for electrical and electronic external connections. These components include rear expansion slots 39 and keyboard cable 36. Base system frame 200 provides openings 27 and 28 to permit connection to rear expansion slots 39 and keyboard connection 36.

The design of main circuit board subassembly 30 is similar, but not identical to the interior portion of the High Profile chassis manufactured by CompuAdd Corporation of Austin, Tex., stock #15000-3. This is a known configuration for the placement of main circuit board 31 and the associated expansion cards 37 and front expansion card guides 38 and rear expansion slots 39, as well as the other components of main circuit board subassembly 30. The technical advantage associated with this design is that the modular approach to main circuit board subassembly 30 and base system unit 20 can be implemented by factory workers trained to assemble the CompuAdd High Profile chassis and similar designs. As a result, implementing the modular design is possible with minimal additional training of factory workers.

Because the basic system unit and main circuit board subassembly 30 are modular in design, they can be assembled separately until they are finally joined. For example, one assembly line in a factory could assemble base system unit 20, including power supply 24, hard drives 22, floppy drives 29 and control panels 33. Another assembly line in the same or a different factory could assemble main circuit board subassembly 30, including main circuit board 31, input/output board and cable 32, speaker assembly and cable 33, fan assembly and cable 35, input/output board and cable 32, and keyboard cable 36. The result would be a separate base system unit 20 and main circuit board subassembly 30 to join together for final system testing and burn in. Thereafter, cover 40 would be placed on the completed computer tower chassis to make the chassis ready for shipment. With the distributed weight made possible by having one assembly line assemble the system unit 20 and another assembly line assemble the main circuit board subassembly 30, the problems of safely handling a complete computer tower chassis are minimized. Although the weight of the completed computer tower chassis is distributed between base system unit 20 and main circuit board of subassembly 30, the weight would not necessarily be distributed evenly, because the number of hard drive devices in base system unit 20 can vary.

Although it is shown that the base system unit 20 and main circuit board subassembly 30 have a particular set of components that join together in each respective module in the preferred embodiment of the present invention, there may be other combinations of respective components as well as additional components that could be included in each of the assemblies for modular fabrication. In particular, base system unit 20 may include multiple hard drive devices and up to five half height media devices in the preferred embodiment. The four bay external drive holder can, for example, accommodate a floppy drive, a tape backup unit, a CD ROM device, and/or a hard drive. Combinations of these are within the scope of the present invention. Moreover, depending on the size and complexity of the computer tower chassis, it may be advantageous for the chassis to comprise more than two separately assembled modules. Additionally, the main circuit board subassembly 30 of the present invention could use various styles of main circuit boards and numerous configurations of expansion boards.

The configuration of components that mount to base support frame 200 depends on the design of the computer tower chassis. However, for the purposes of the present invention, the configuration must permit separating and joining of the main circuit board subassembly 30 from base system unit 20. Additionally, this arrangement of the individual support frames 201, 202, 203, 204 and 205 may be varied according to the particular design requirements of both base system unit 20 and interconnection requirements of main circuit board subassembly 30. Easy withdrawal of expansion cards 37 from main circuit board subassembly 30, without the need to disassemble main circuit board subassembly 30 from base system unit 20, is another design consideration of the present invention. In other words, a modular design of base system unit 20 and main circuit board subassembly 30 need not adversely affect the interchangeability of expansion cards with the main circuit board 31.

Figure 4:
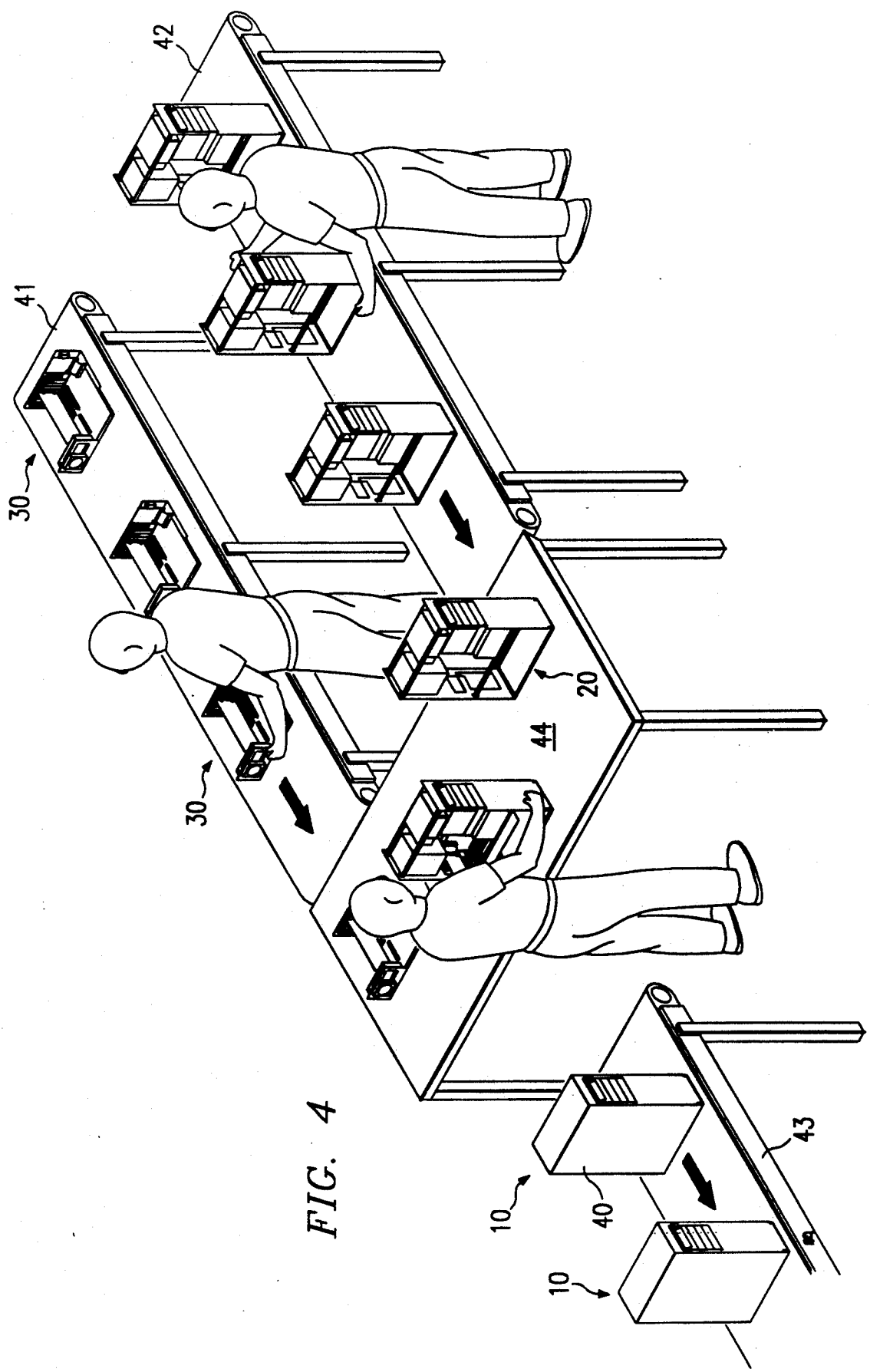
FIG. 4 illustrates the relative size of a computer tower chassis as it progresses along an assembly line to show some of the advantages of the preferred embodiment of the present invention.

FIG. 4 illustrates an important aspect of the preferred embodiment of the present invention. Along assembly lines 41 and 42 travel main circuit board subassembly 30 and base system unit 20, respectively. At station 44, for example, main circuit board subassembly 30 and base system unit 20 may be joined to result (after placement of cover 40) in completed tower chassis 10. Tower chassis 10 joining in this manner achieves many of the purposes of the present invention.

Although the invention has been described with reference to the above specific embodiments, this description is not meant to be construed in a limiting sense. Various modifications of the disclosed embodiment, as well as alternative embodiments of the invention will become apparent to persons skilled in the art from reference to the above description. It is further contemplated that the claims will cover such modifications and fall within the true scope of the invention.

What is claimed is:

1. A modular personal computer, comprising:

a base system unit including a support frame having a front support plate and a rear support plate, the rear support plate being spaced from the front support plate, at least one structural beam connecting the front support plate to the rear support plate, a power supply mounted within the base system unit, a control panel mounted to the base system unit, and one or more disk drives selected from the group consisting of hard drives and floppy drives attached to the base system unit;

a main circuit board assembly configured to mount adjacent to the base system unit, and including a subassembly plate having front and rear edges, a front subassembly panel having an orifice therethrough attached to the front edge of the subassembly plate, a rear subassembly panel having a plurality of orifices therethrough attached to the rear edge of the subassembly plate, at least one front expansion board guide attached to the front subassembly panel, at least one rear expansion slot attached to the rear subassembly panel, a main circuit board removably mounted to the subassembly plate, at least one expansion card having front and rear end removably connected to the main circuit board whereby the front and rear ends of the expansion cards removably connect to the front expansion board guides and to the rear expansion slots, respectively, when the main circuit board is mounted to the subassembly plate, the main circuit board assembly further including an input/output board having an input/output cable mounted to the subassembly plate, a speaker assembly having a speaker cable and a fan assembly having a fan cable mounted in the orifice of the front subassembly panel, and a battery pack having a battery pack cable, and a keyboard cable mounted to, and extending through respective orifices in, the rear subassembly panel; and a cover for removably covering the base system unit and the main circuit board assembly.

* * * * *